M. DERVOZ.
NUT LOCK.
APPLICATION FILED AUG. 31, 1916.
1,225,785. Patented May 15, 1917.
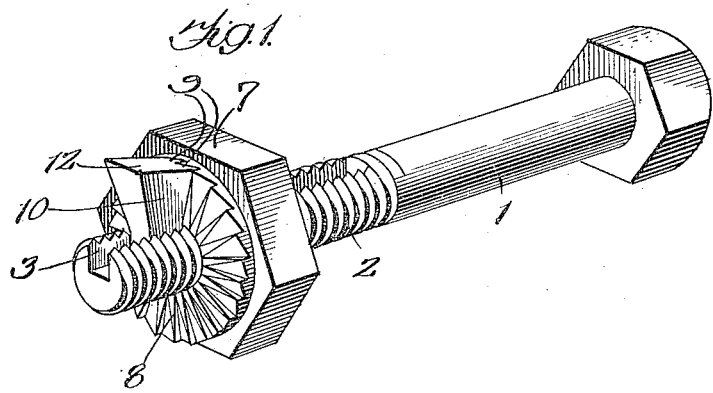
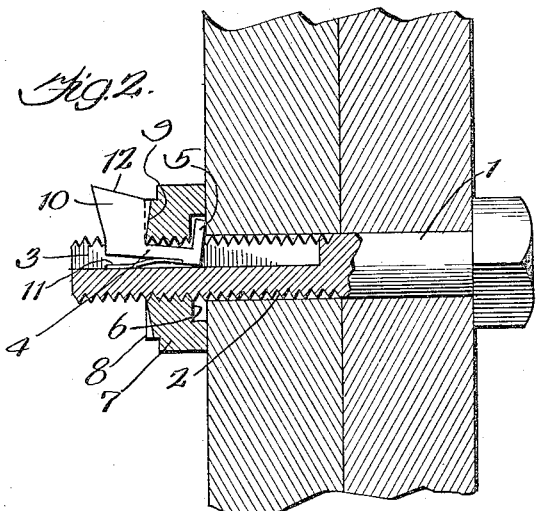
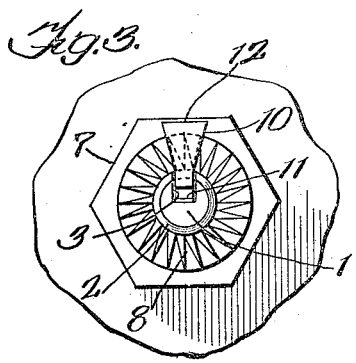
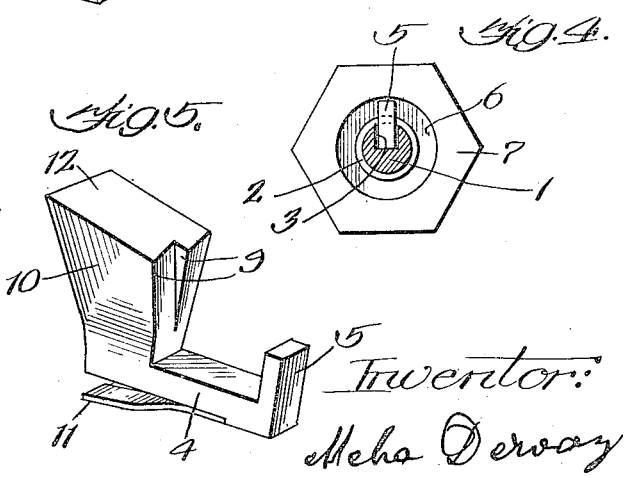
Inventor:
Meha Dervoz

UNITED STATES PATENT OFFICE.

MEHO DERVOZ, OF CHICAGO, ILLINOIS.

NUT-LOCK.

1,225,785.   Specification of Letters Patent.   Patented May 15, 1917.

Application filed August 31, 1916. Serial No. 117,845.

*To all whom it may concern:*

Be it known that I, MEHO DERVOZ, a subject of the Emperor of Austria, residing at Chicago, in the county of Cook and State of Illinois, have invented a certain new and useful Improvement in Nut-Locks, of which the following is a specification.

My invention relates to nut locks and the object of the invention is to provide a simple device of this character which will lock automatically whether the nut is tightened up against the held object or not. Another object is to provide a device which may be utilized repeatedly without damage to the device. Another object is to provide a construction by which the nut may be instantly released by exerting slight pressure by the fingers. Another object is to provide a construction in which the locking mechanism will automatically take hold of the nut whenever the nut is rotated through a slight angle.

I obtain my objects by the mechanism illustrated in the accompanying drawings, in which:

Figure 1 is a perspective view of the complete device.

Fig. 2 is an assembly view showing some of the parts in axial section.

Fig. 3 is an end view looking toward the right in Fig. 2.

Fig. 4 is a sectional view taken through the threaded shank of the bolt, viewing the inner surface of the nut and parts mounted thereon.

Fig. 5 is a perspective of the locking key or dog.

Similar numerals refer to similar parts throughout the several views.

The bolt 1 has a threaded portion 2 as usual. A longitudinal slot 3 is formed in the threaded portion. This forms a key way for the locking dog, which is shown separately in Fig. 5. Said dog has a foot 4 which slides in the slot. This terminates at the inner end with an upturned toe 5 which fits into the annular countersink 6 in the nut 7. Ratchet teeth 8 are formed in the outer face of the nut, and these are engaged by the teeth 9 formed on the inner surface of the body 10 of the dog. A spring 11 mounted on the sole of the foot constantly urges the outer end of the dog upward and this forces the teeth 9 toward and into engagement with the teeth 8 of the nut. By preference, the body of the dog has a broad upper surface 12 upon which the thumb of the user may rest to depress the dog when it is to be released.

In operation, when the parts are assembled as shown in Figs. 1 and 2, by rotating the nut in a direction to tighten it, the toe 5 causes the dog to travel longitudinally with the nut. At the same time the spring 11 resting upon the bottom of the slot, keeps the teeth 9 of the dog in engagement with the teeth 8 of the nut. By preference, the number of the teeth in the nut is comparatively large; for instance, in a nut for a half inch bolt, I would ordinarily provide twenty-four teeth, or thereabout. The result is that the nut need be rotated through only a small angle before the teeth of the dog will reëngage the teeth of the nut.

When it is desired to release the nut, all that is necessary is for the operator to place his thumb or finger upon the upper surface 12 of the dog and depress the dog, thereby disengaging the teeth and permitting the nut to be rotated in a direction to back it off.

It will be seen that as soon as the parts constituting my device are assembled, the dog will lock the nut, regardless of whether the nut has been screwed home against the held object or not; in other words, the nut is locked upon the bolt at all times, and hence may be used in many situations that would not be open to it otherwise.

It will also be observed that the device may be used over and over again for the parts are not damaged in any way in tightening into place.

The construction is simple and the parts are few in number, and hence may be easily and cheaply manufactured.

Having thus described my invention, what I claim as new and desire to secure by Letters Patent, is:

1. In combination, a longitudinally slotted bolt, a nut having ratchet teeth formed in its outer end surface, a one piece dog having a foot sliding in said slot and an upstanding body having a tooth facing the toothed surface of said nut, and a spring located between the bottom of the slot and the foot of the dog for pressing said body toward said teeth.

2. In a nut lock, the combination of a threaded bolt having a longitudinal slot, a nut having ratchet teeth formed in its outer surface and an annular countersink on its inner surface, a dog having a foot sliding in said slot, an upturned toe fitting into said countersink, an upstanding body at the outer end of the foot, a tooth on the inner surface of said body for engaging the teeth on the foot, and a leaf spring located between the bottom of the slot and the foot of the dog for pressing the latter radially outward.

3. In a nut lock, the combination of a threaded bolt having a longitudinal slot, a nut having ratchet teeth formed in its outer surface and an annular countersink on its inner surface, a dog having a foot sliding in said slot, an upturned toe fitting into said countersink, an upstanding body at the outer end of the foot, a tooth on the inner surface of said body for engaging the teeth on the foot, and a spring on the sole of the foot for urging the body of the dog toward the teeth on the nut.

In witness whereof, I have hereunto subscribed my name in the presence of two witnesses.

MEHO DERVOZ.

Witnesses:
HOWARD M. COX,
MARGARET D. ROBB.

Copies of this patent may be obtained for five cents each, by addressing the "Commissioner of Patents, Washington, D. C."